United States Patent [19]

Means et al.

[11] 3,962,812
[45] June 15, 1976

[54] SIGNALING DEVICE FOR A FISHING ROD

[76] Inventors: Donald J. Means, 3284 Piney Ridge Road, Rte. No. 3, Ludington, Mich. 49431; John R. Conlin, Jr., Rte. No. 1, Eau Claire, Mich. 49111

[22] Filed: Apr. 3, 1975

[21] Appl. No.: 564,699

[52] U.S. Cl. ............................................... 43/17
[51] Int. Cl.² ......................................... A01K 97/12
[58] Field of Search ....................................... 43/17

[56] References Cited
UNITED STATES PATENTS

| | | | |
|---|---|---|---|
| 2,589,610 | 3/1952 | Fowler | 43/17 |
| 2,663,962 | 12/1953 | King | 43/17 |
| 3,012,352 | 12/1961 | Logsdon | 43/17 |
| 3,058,255 | 10/1962 | Gorham | 43/24 |
| 3,727,342 | 4/1973 | Lindsey, Jr. | 43/17 |

*Primary Examiner*—Hugh R. Chamblee
*Assistant Examiner*—Daniel J. Leach

[57] ABSTRACT

A signaling device is provided for use on a fishing rod. The device includes an adapter for connection to the tip of a fishing rod in place of the line guide thereof and a substantially straight balance beam pivotally mounted on the adapter. The balance beam includes a line guide on the outer end thereof and a pair of wedging surfaces on the inner end adapted retainably to receive one or more shot weights. The shot weights provide a means of predeterminably adjusting the balance moment for normally retaining the balance beam in generally parallel relationship to the fishing rod against the combined line loading of hook, weight, and pull by a biting fish so that a predetermined pull by the fish will pivot the line guide end of the balance beam downward from parallel alignment with the fishing rod thereby to signal a bite.

9 Claims, 6 Drawing Figures

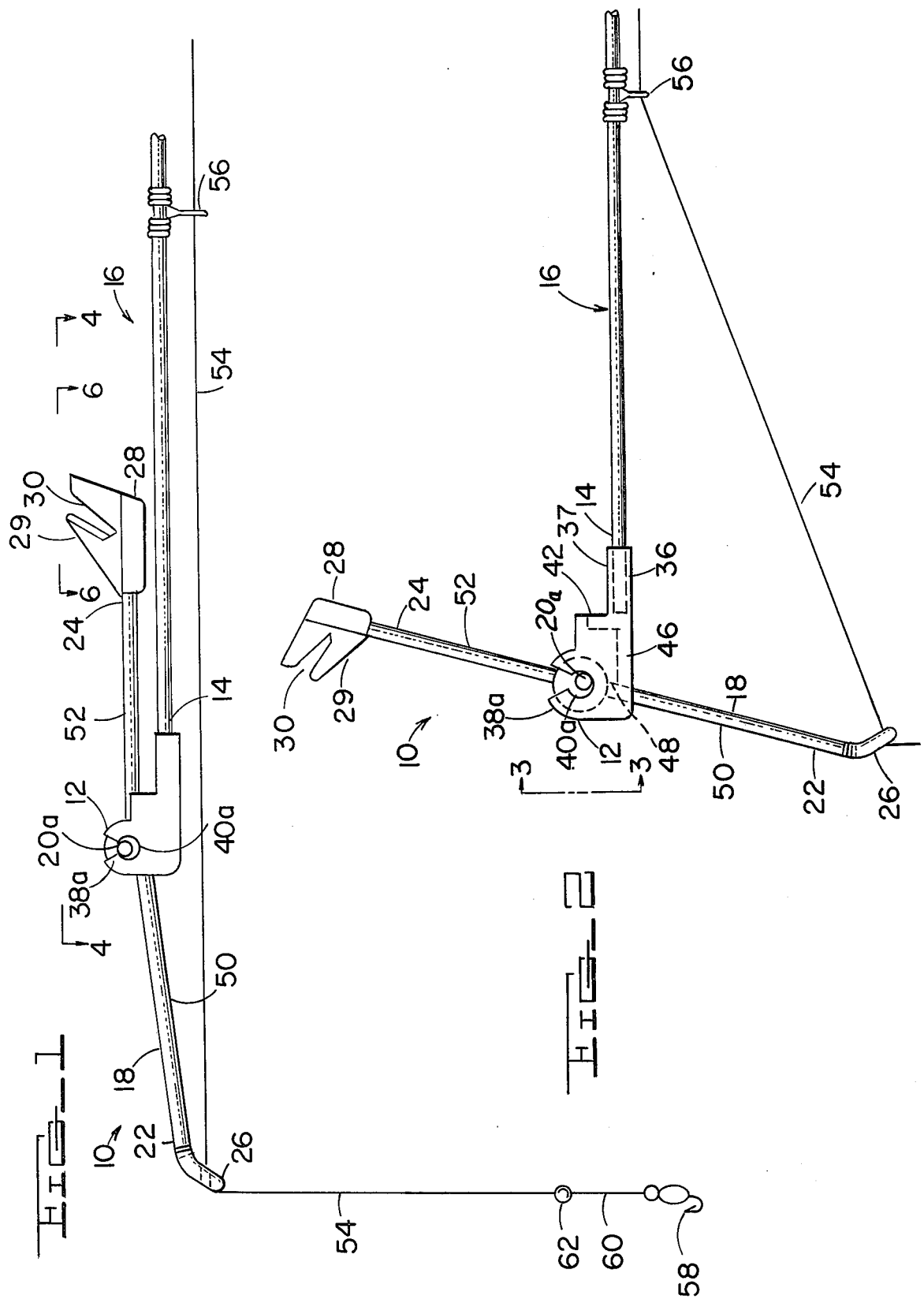

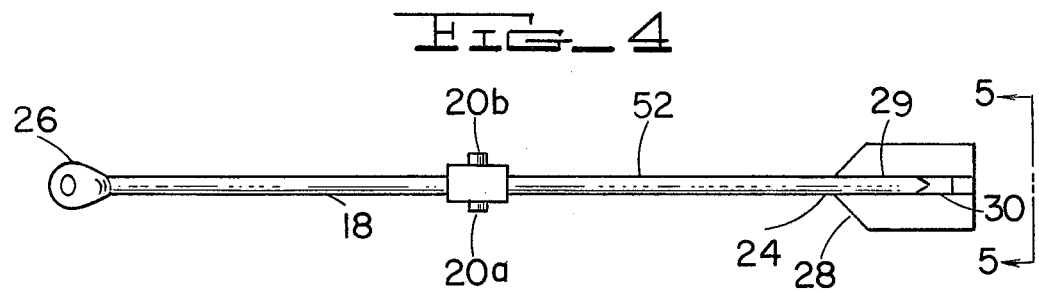
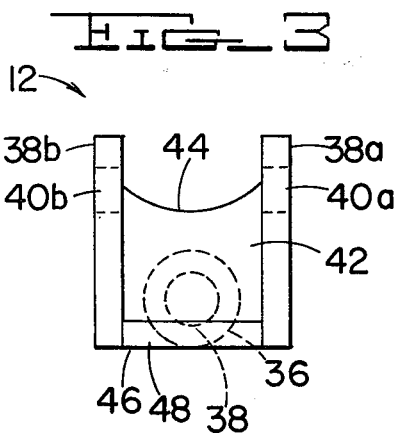
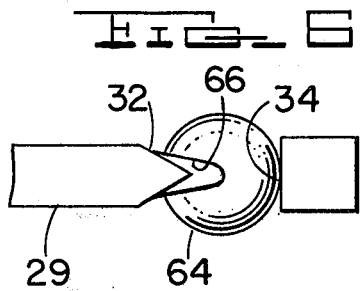

SIGNALING DEVICE FOR A FISHING ROD

BACKGROUND OF THE INVENTION

This invention relates generally to a signaling device for use with fishing rods and more particularly to a balance beam type of signaling device which may be mounted on the tip of a fishing rod.

DESCRIPTION OF THE PRIOR ART

Balance beam elements have been utilized by Logsdon, U.S. Pat. No. 3,012,352; Apitz, U.S. Pat. No. 3,187,456; and Lenning, U.S. Pat. No. 3,407,528 as signaling devices for fishing apparatus. Apitz resiliently mounts his balance beam for spring action relative to rigid mounting of one end of his device in the ground and provides a movable weight counterbalancing the balance beam. In contrast to the aforementioned prior art devices, the present invention provides a device that is unique in that it is attached to the tip of a conventional fishing rod, that is smaller and more economical than the aforementioned art devices, that provides a resistance to signaling which is precisely adjustable, and that provides a resistance to line pull which decreases rapidly over a predetermined length of line pull.

SUMMARY OF THE INVENTION

In accordance with the broader aspects of the invention, there is provided a signaling device for use on a fishing rod having a reel end and a distal or tip end. The device includes a substantially straight balance beam and an adapter having a tapered socket therein for connection to the tip of the fishing rod. The balance beam includes a line guide on the outer end thereof and a tailpiece on the other end, the tailpiece having a fin which includes a pair of wedging surfaces therein. The balance beam includes a pair of trunnions intermediate the ends thereof which are pivotally retained in a pair of lugs on the adapter.

In use, one or more conventional shot weights are selected and inserted between the wedging surfaces of the fin to counterbalance the weight of the hook and whatever weights are used on the line adjacent the hook to provide a predetermined moment for normally retaining the balance beam in a position generally parallel to the fishing rod. When a fish bites, it is able to take the bait and the hook for a predetermined distance. During this time the initial line pull is quite small and it rapidly decreases until the line pull on the line guide rotates the outer end downward to a point where the balance beam engages a stop on the adapter. The sudden increase in line tension, as caused by the movement of the fish pulling the balance beam downward against the stop, is effective to set the hook. Further, the upward movement of fin signals a bite.

It is an object of this invention to provide a signaling device for attachment to and use with a fishing rod.

It is another object of this invention to provide a balance beam type of signaling device for attachment to and use with a fishing rod.

It is still another object of this invention to provide a balance beam type of signaling device for use with a fishing rod in which the balance beam includes a pair of wedging surfaces for receiving shot weights.

The above-mentioned and other features and objects of this invention and the manner of obtaining them will become more apparent and the invention itself will be best understood by reference to the following description of an embodiment of the invention taken in conjunction with the accompanying drawings.

BRIEF DESCRIPTION OF THE DRAWINGS

In the drawings:

FIG. 1 is a front elevation of the signaling device of the invention connected to a conventional fishing rod;

FIG. 2 is a front elevation of the device of FIG. 1 with the balance beam thereof pivoted to its stop position;

FIG. 3 is a partial and enlarged end view of the device, showing the adapter thereof, taken generally along line 3–3 of FIG. 2;

FIG. 4 is a partial top view of the device, showing a portion of the balance beam thereof, taken generally along the line 4—4 of FIG. 1;

FIG. 5 is an end view of the balance beam, showing the tailpiece thereof, taken generally along the line 5—5 of FIG. 4; and FIG. 6 is a partial top view of the tailpiece of FIG. 5, showing the wedging surfaces in the fin thereof, taken generally along the line 6—6 of FIG. 1.

DESCRIPTION OF THE PREFERRED EMBODIMENT

Referring now to the drawings, and primarily to FIGS. 1 and 4, the signaling device of the invention, generally indicated at 10, includes an adapter member 12 which is attached to distal or tip end 14 of conventional fishing rod 16. Signaling device 10 includes an elongated balance beam member 18 which has a pair of trunnions 20a and 20b intermediate outer end 22 and inner end 24. Line guide element 26 is mounted on outer end 22 and tailpiece 28 is mounted on inner end 24. Tailpiece 28 includes fin element 29 having wedge-shaped slot 30. Wedge-shaped slot 30 includes a knife-edge wedging surface 32 and a blunt wedging surface 34 as more clearly seen in FIG. 6.

Referring now additionally to FIGS. 2 and 3, adapter 12 includes cylindrical portion 36 having longitudinally disposed and tapered socket 37 therein which serves as a connector means for receiving tip end 14 of fishing rod 16. A pair of transversely spaced-apart lugs 38a and 38b attached to cylindrical portion 36 and respectively having trunnion-receiving notches 40a and 40b, web 42 intermediate lugs 38a and 38b which provides saddle portion 44, and second web portion 46 intermediate lugs 38a and 38b and having an end or stop surface 48. Trunnions 20a, 20b are respectively received in notches 40a, 40b, as shown.

Balance beam 18 includes front portion 50 intermediate outer end 22 and the trunnions 20a and 20b, and rear portion 52 intermediate tailpiece 28 and the trunnions 20a and 20b. In a physical embodiment, the portions 50 and 52 are substantially equal in length and tailpiece 28 is of a weight such that there is supplied at the slot 30, a weight slightly greater than that which would balance the balance beam 18.

In operation, line 54 from the reel (not shown) of fishing rod 16 is threaded through line guide 56 of fishing rod 16 and through the line guide 26 of signaling device 10. A suitable hook 58 and bait (not shown) are attached to the end 60 of the line 54 and a weight 62 may be attached to line 54 spaced from hook 58, as desired. A conventional split-shot weight 64 (FIG. 6) is wedged into wedge-shaped slot 30 with slot 66 of weight 64 engaging knife-edge wedging surface 32. By selection of the size of line weight 62 and, by the selection and application of one or more shot-weights 64, the pull on the hook 58 which is necessary to tip the balance beam 18 to the position as shown in FIG. 2, can be maintained at less than 0.04 grams regardless of the length of line used and the actual weight of the weight 62 and the hook 58.

Balance beam 18 is maintained in its normal position shown in FIG. 1 by the weight of tailpiece 28 and by the weight of split-shot weight 64, if any. As shown in FIG. 1, balance beam 18 engages a first stop means which is provided by the saddle 44 wherein balance beam 18 is generally parallel with fishing rod 16; although front portion 50 may be bent downward somewhat, as shown in FIGS. 1 and 2, so that the line guide 26 is in general alignment with the line guide 56 of the fishing rod 16.

When a fish pulls on hook 58, balance beam 18 is pivoted to the position as shown in FIG. 2 wherein front portion 50 of the balance beam 18 abuts stop surface 48 of adapter 12. Stop surface or second stop means 48 limits pivotal rotation of balance beam 18 to a position at an angle with respect to fishing rod 16 of somewhat less than 90 degrees.

When a fish takes the hook 58 and the bait attached thereto, the balance beam rotates or pivots from the normal position as shown in FIG. 1 to the upper, signaling position shown in FIG. 2 with a low, predetermined, and rapidly decreasing line pull; and then, when the balance beam 18 engages stop surface 48 of adapter 12, the resistance to the movement of the line, as caused by the fish taking the bait, is suddenly increased. The low and rapidly decreasing line pull which is required to tip the balance beam prevents the fish from sensing the load of the signaling device; and the sudden increase in line tension, as the balance beam hits the stop surface 48 is effective to translate the movement of the fish into a sudden hook-setting force. Further, fin 29 in the upper position thereof shown in FIG. 2 signals a bite.

Balance beam 18 including trunnions 20a, 20b, line guide 26, and fin 29 may be a single, integrally molded part, as may adapter 12, i.e., a total of only 2 parts. It can be seen that signaling device 10 is small, simple, economical to construct, can easily and simply be adjusted for any size of line weight 62, retains a high and precise degree of sensitivity even when using large line weights 62 to more rapidly submerge long lines into deep water, can be manufactured and merchandised as an attachment to a conventional fishing rod, or can be manufactured and sold as an integral part of fishing rods.

While there have been described above the principles of this invention in connection with specific apparatus, it is to be clearly understood that this description is made only by way of example and not as a limitation to the scope of the invention.

What is claimed is:

1. A signaling device for use on a fishing rod having a reel end and a tip end, said device comprising: an adapter member having means for connection to said rod tip end; and a generally straight, elongated, balance beam member having opposite ends, said beam member having a line guide element on one end thereof, and means including a fin element on the other end thereof for retainably receiving shot weights, said beam member being pivotally mounted intermediate said ends thereof on said adapter member for movement between a normal position with said beam member generally parallel with said rod and with said line guide element spaced outwardly from said tip end of said rod, and a signaling position at an angle with respect to said rod.

2. The device of claim 1 wherein said fin element has a wedge-shaped slot formed therein for receiving said shot-weights.

3. The device of claim 2 wherein said slot is defined by knife-edge and blunt wedging surfaces.

4. The device of claim 1 wherein said connection means comprises a socket in said adapter member for retainably receiving said tip end of said rod.

5. The device of claim 1 wherein said device includes first stop means for limiting pivotal movement of said beam member in a first direction thereby establishing said normal position thereof in which said other end of said beam member extends toward said reel end of said rod, and second stop means for limiting pivotal movement of said beam member away from said normal position to less than 90° with respect to said rod thereby establishing said signaling position.

6. The device of claim 1 wherein said pivotal mounting of said beam member comprises a pair of trunnion elements respectively extending outwardly from said beam member; said connection means comprising a socket formed in said adapter member for retainably receiving said tip end of said rod; said adapter member comprising a portion having said socket longitudinally disposed therein, a pair of transversely spaced-apart lugs parallel with and on opposite sides of the longitudinal axis of said portion and extending outwardly therefrom, said lugs respectively having notches therein each pivotally receiving one of said trunnion elements, a saddle portion formed intermediate said lugs and having a height from said axis which limits pivotal movement of said other end of said balance beam member to said normal position, and a web portion positioned between said lugs for limiting the maximum pivoting angle between said balance beam member and said fishing rod to less than 90° thereby establishing said signaling position; said weight elements being shot-weights, said receiving means comprising a tailpiece attached to said other end of said balance beam member and including a fin which extends outwardly from the longitudinal axis of said balance beam member, said fin having a wedge-shaped slot formed therein for receiving said weights, said fin having one knife-edge wedging surface and one blunt wedging surface.

7. The apparatus of claim 6 wherein the distance from said trunnion elements to said line guide element is substantially equal to the distance from said trunnion elements to the center of said wedge-shaped slot, said tailpiece and portion of said balance beam member between said trunnions and said tailpiece providing a tilting moment greater than the tilting moment provided by said line guide and the portion of said balance beam between said line guide and said trunnions.

8. A signaling device for use on a fishing rod having a reel end and a tip end, said device comprising: an adapter member having a socket formed therein for retainably receiving said tip end of said rod; and an elongated balance beam member having opposite ends and having a line guide element on one end thereof; said beam member having a weight element at the other end thereof, said beam member having a pair of trunnion elements respectively extending outwardly from opposite sides thereof intermediate said opposite ends; said adapter member having a pair of transversely spaced-apart lug elements parallel with and on opposite sides of the longitudinal axis of said rod and extending outwardly therefrom, said lugs respectively having means therein for pivotally receiving said trunnion elements whereby said beam member is mounted on said adapter member for pivotal movement between a normal position with said beam member generally parallel with said rod and with said line guide element spaced outwardly from said tip end of said rod, and a signaling position at an angle with respect to said rod; said adapter member having means for limiting said pivotal movement of said other end of said beam member to said normal position, and means for limiting the maximum pivoting angle between said balance beam member and said rod to less than 90° thereby establishing said signaling position.

9. The device of claim 8 wherein the distance from said trunnion elements to said line guide element is substantially equal to the distance from said trunnion elements to said weight element, said weight element and the portion of said balance beam member between said trunnion elements and said weight element providing a tilting moment greater than the tilting moment provided by said line guide and the portion of said balance beam between said line guide and said trunnion elements.

* * * * *